US012762457B2

(12) United States Patent
Shutty

(10) Patent No.: US 12,762,457 B2
(45) Date of Patent: Oct. 13, 2026

(54) PARALLEL DECODING FOR QUANTUM ERROR CORRECTING CODES

(71) Applicant: Google LLC, Mountain View, CA (US)

(72) Inventor: Noah John Shutty, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 128 days.

(21) Appl. No.: 18/952,829

(22) Filed: Nov. 19, 2024

(65) Prior Publication Data

US 2026/0127481 A1 May 7, 2026

Related U.S. Application Data

(63) Continuation of application No. 18/329,377, filed on Jun. 5, 2023, now Pat. No. 12,169,762.

(51) Int. Cl.
*G06N 10/70* (2022.01)

(52) U.S. Cl.
CPC .................................... *G06N 10/70* (2022.01)

(58) Field of Classification Search
CPC ...................................................... G06N 10/70
See application file for complete search history.

(56) References Cited

U.S. PATENT DOCUMENTS

2021/0124640 A1* 4/2021 Nickerson .............. G06N 10/70
2023/0129732 A1* 4/2023 Schmitz ................. G06N 10/70
714/10
2024/0171889 A1* 5/2024 Litinski .................. G06N 10/70

OTHER PUBLICATIONS

Anderson et al., "Wait-free parallel algorithms for the union-find problem," Proceedings of the Twenty-Third Annual ACM Symposium on Theory of Computing, Jan. 1991, 370-380.
Delfosse et al., "Almost-linear time decoding algorithm for topological codes," CoRR, submitted on Nov. 24, 2021, arXiv:1709.06218v3, 12 pages.
Fowler et al., "Towards Practical Classical Processing for the Surface Code," CoRR, submitted on Oct. 24, 2011, arXiv:1110.5133v1, 4 pages.
Fowler et al., "Towards practical classical processing for the surface code: Timing analysis," CoRR, submitted on Oct. 15, 2012, arXiv:1202.5602v2, 13 pages.

(Continued)

*Primary Examiner* — Joseph D Torres
(74) *Attorney, Agent, or Firm* — Fish & Richardson P.C.

(57) ABSTRACT

Methods, systems, and apparatus for parallel decoding for quantum error correction codes. In one aspect, a classical computer system is configured to implement a decoding process on measurement data received from a quantum computing system to determine errors in a quantum computation. The classical computing system implements a main thread, multiple worker threads, and a data structure common to each worker thread. The data structure stores data of a dynamic system of disjoint clusters of nodes of a detector graph for the decoding process, where the data includes compressed logical flip information of child nodes in each cluster of nodes. During execution of the decoding process, the multiple worker threads are configured to, in parallel: obtain clusters of nodes and modify the clusters of nodes, where, for each modification, the worker thread updates data in the data structure that corresponds to the cluster under an atomicity primitive.

20 Claims, 5 Drawing Sheets

(56) References Cited

OTHER PUBLICATIONS

Fowler, "Minimum weight perfect matching of fault-tolerant topological quantum error correction in average O(1) parallel time," CoRR, submitted on Oct. 10, 2014, arXiv:1307.1740v3, 8 pages.
Galler et al., "An improved equivalence algorithm," Communications of the ACM, May 1, 1964, 7(5):301-303.
Google Quantum AI, "Suppressing quantum errors by scaling a surface code logical qubit," CoRR, submitted on Jul. 20, 2022, arXiv:2207.06431v2, 44 pages.
Harris et al., "A practical multi-word compare-and-swap operation," Proceedings of the 16th International Conference on Distributed Computing, Oct. 2002, 265-279.
Harris, "A Pragmatic Implementation of Non-blocking Linked-Lists," Proceedings of the 15th International Conference on Distributed Computing, Oct. 2001, 300-314.
Huang et al., "Fault-Tolerant Weighted Union-Find Decoding on the Toric Code," CoRR, submitted on Apr. 9, 2020, arXiv:2004.04693v1, 6 pages.
IBM.com [online], "IBM Unveils 400 Qubit-Plus Quantum Processor and Next-Generation IBM Quantum System Two," Nov. 9, 2022, retrieved on Mar. 7, 2024, retrieved from URL <https://newsroom.ibm.com/2022-11-09-IBM-Unveils-400-Qubit-Plus-Quantum-Processor-and-Next-Generation-IBM-Quantum-System-Two>, 5 pages.
International Search Report and Written Opinion in International Appln. No. PCT/US2024/031702, mailed on Sep. 19, 2024, 15 pages.
Liyanage et al., "Scalable Quantum Error Correction for Surface Codes using FPGA" CoRR, Submitted on May 15, 2023, arXiv:2301.08419v2, 12 pages.
Quantumai.google [online], "Quantum Computer Datasheet," May 14, 2021, retrieved on Mar. 7, 2024, retrieved from URL <https://quantumai.google/hardware/datasheet/weber.pdf>, 6 pages.
Tan et al., "Scalable surface code decoders with parallelization in time," CoRR, submitted on Sep. 29, 2022, arXiv:2209.09219v2, 24 pages.
Tarjan, "Efficiency of a Good But Not Linear Set Union Algorithm," Journal of the Associatmn for Computing Machinery, Apr. 1975, 22(2):215-225.
Wu et al., "Fusion Blossom: Fast MWPM Decoders for QEC" CoRR, Submitted on May 15, 2023, arXiv:2305.08307v1, 18 pages.
International Preliminary Report on Patentability in International Appln. No. PCT/US2024/031702, mailed on Dec. 18, 2025, 10 pages.
Office Action in Australian Appln. No. 2024283633, mailed on Mar. 5, 2026, 3 pages.
Notice of Allowance in Australian Appln. No. 2024283633, mailed on Apr. 7, 2026, 3 pages.
Notice of Allowance in Japanese Appln. No. 2025-515445, mailed on May 12, 2026, 6 pages (with English machine translation).

* cited by examiner

PARALLEL DECODING FOR QUANTUM ERROR CORRECTING CODES

CROSS-REFERENCE TO RELATED APPLICATIONS

This application is a continuation application and claims priority under 35 U.S.C. § 120 to U.S. patent application Ser. No. 18/329,377, filed on Jun. 5, 2023. The disclosure of the foregoing application is incorporated herein by reference in its entirety for all purposes.

BACKGROUND

This specification relates to quantum computing.

Quantum computing provides a means to solve certain problems that cannot be solved in a reasonable period of time using conventional classical computers. These problems include factoring very large numbers into their primes and searching large, unstructured data sets. A number of physical systems are being explored for their use in quantum computing, including ions, spins in semiconductors, and superconducting circuits. However, these systems do not perform sufficiently well to serve directly as computational qubits. For example, single two-state physical systems, which can be used as physical qubits, cannot reliably encode and retain information for long enough to be useful, e.g., due to noise.

Quantum error correction is a technology that can enable a quantum computer to reliably execute a quantum algorithm despite noise afflicting its qubits. A decoder is a key component of quantum error correction schemes whose role is to identify errors faster than they accumulate in the quantum computer. The decoder takes as an input a syndrome, which is measurement data extracted from quantum parity check measurements, and returns as output an estimation of error. Given this estimation, the effect of the error can be reversed. Decoders should be implemented with minimum hardware resources in order to scale to the regime of practical applications of quantum computing.

SUMMARY

This specification describes methods, systems and apparatus for parallel decoding for quantum error correcting codes.

One innovative aspect of the subject matter described in this specification can be implemented in a classical computer system configured to implement a decoding process on measurement data received from a quantum computing system to determine errors in a quantum computation implemented by the quantum computing system, wherein the classical computing system implements: a main thread; multiple worker threads; and a data structure common to each worker thread of the multiple worker threads, wherein the data structure stores data of a dynamic system of disjoint clusters of nodes of a detector graph for the decoding process, wherein: each cluster of nodes comprises a root node that has no ascendant node and one or more descending child nodes, wherein the child nodes include leaf nodes with no descending nodes or one or more descending child nodes; and the data comprises compressed logical flip information of child nodes in each cluster of nodes; wherein during execution of the decoding process, each of the multiple worker threads is configured to, in parallel with each of the other worker threads: obtain, from the main thread, one or more clusters of nodes in the detector graph, wherein each cluster of nodes comprises one or more detection events in the measurement data; and execute the decoding process to modify the one or more clusters of nodes, wherein, for each modification of a cluster, the worker thread updates data in the data structure that corresponds to the cluster under an atomicity primitive.

The classical computer system can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the data structure stores, at a root node of each cluster of nodes, data specifying one or more of: a node type specifier, a parity of detection events in the cluster of nodes, a total size of the cluster of nodes, boundary nodes of the cluster of nodes, a minimum time coordinate, and a maximum time coordinate.

In some implementations the classical computing system further comprises one or more memory regions external to the data structure, wherein each memory region stores a boundary map for a respective cluster of nodes.

In some implementations data objects in the memory region are stored under a conservation law, wherein under the conservation law data in the data objects are popped off a child node memory before push updates add the data to objects associated with a root node.

In some implementations the compressed logical flip information of a child node included in a respective cluster of nodes is stored at the child node.

In some implementations compressed logical flip information of a child node comprises a parity of logical flips along a decoding graph path from the child node to its parent node, and wherein the compressed logical flip information is used with cluster parity information to determine a parity flip applied to a logical observable by a fusion of two clusters.

In some implementations the classical computing system is further configured to recover a decoding output of the decoding process, comprising using data in the data structure to: compute, for each node in the detector graph that is associated with a detection event, a net logical flip on a path to a respective root node of the node; and compute a total parity of the net logical flips.

In some implementations the decoding process comprises a union-find or minimum weight perfect matching decoding process.

In some implementations the data structure is lock-free.

In some implementations the atomicity primitive comprises a compare-and-swap atomicity primitive or an atomic pool allocator with reference counting.

In some implementations updates of data in the data structure that correspond to a respective modification of a cluster are packed into a single word, optionally wherein the single word comprises a pointer to external atomic data.

In some implementations during execution of the decoding process the main thread is configured to: identify detection events in the measurement data; seed, for each detection event, a cluster of nodes in the detector graph with non-zero parity; and place the seeded clusters of nodes into a central list structure, wherein the multiple worker threads obtain respective clusters of nodes from the central list structure.

Another innovative aspect of the subject matter described in this specification can be implemented in a method for executing a decoding process on measurement data received from a quantum computing system to determine errors in a quantum computation implemented by the quantum computing system. The method can include instantiating a data structure common to each worker thread of multiple worker threads, wherein the data structure stores data of a dynamic system of disjoint clusters of nodes of a detector graph for the decoding process, wherein: each cluster of nodes comprises a root node that has no ascendant node and one or more descending child nodes, wherein the child nodes include leaf nodes with no descending nodes or one or more descending child nodes; and the data comprises compressed logical flip information of child nodes in each cluster of nodes; for each worker thread of the multiple worker threads and in parallel with each of the other worker threads: obtaining, from a main thread, one or more of the clusters of nodes, wherein each obtained cluster of nodes comprises one or more detection events in the measurement data; executing the decoding process on the detector graph to modify the obtained one or more clusters of nodes, comprising, for each modification of a cluster, updating data in the data structure that corresponds to the cluster under an atomicity primitive; and recovering a decoding output of the decoding process using the updated data in the data structure.

Other implementations of these aspects include corresponding computer systems, apparatus, and computer programs recorded on one or more computer storage devices, each configured to perform the actions of the methods. A system of one or more classical computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations recovering the decoding output of the decoding process using the updated data in the data structure comprises: computing, for each node in the detector graph that is associated with a detection event, a net logical flip on a path to a respective root node of the node; and computing a total parity of the net logical flips.

In some implementations the data structure stores, at a root node of each cluster of nodes, data specifying one or more of: a node type specifier, a parity of detection events in the cluster of nodes, a total size of the cluster of nodes, boundary nodes of the cluster of nodes, a minimum time coordinate, and a maximum time coordinate.

In some implementations compressed logical flip information of a child node comprises a parity flip applied to a logical observable by an operator with a 0-boundary that comprises the child node and a parent node in a corresponding graph tree.

In some implementations the decoding process comprises a union-find or minimum weight perfect matching decoding process.

In some implementations the atomicity primitive comprises a compare-and-swap atomicity primitive or an atomic pool allocator with reference counting.

In some implementations updating data in the data structure that corresponds to a respective modification of a cluster comprises packing the updates into a single word, optionally wherein the single word comprises a pointer to external atomic data.

In some implementations the method further comprises identifying, by the main thread, detection events in the measurement data; seeding, by the main thread and for each detection event, a cluster of nodes in the detector graph with non-zero parity; and placing, by the main thread, the seeded clusters of nodes into a central list structure, wherein the multiple worker threads obtain respective clusters of nodes from the central list structure.

The subject matter described in this specification can be implemented in particular ways so as to realize one or more of the following advantages.

A challenging sub-problem that arises when implementing quantum error correction is real-time decoding of quantum error-correcting codes. In real-time decoding, a classical algorithm called a decoder processes a stream of classical bits from the quantum computer and outputs predictions in real-time about a logical state of a quantum algorithm being performed by the quantum computer. It can be difficult for a decoder to meet the high throughput and low latency requirements of real-time decoding whilst maintaining a sufficient level of accuracy. Ideally the decoder should process the stream of classical bits fast enough to keep pace with the clock-speed of the quantum computer. For example, a surface code superconducting quantum computer with a million physical qubits can generate measurement data at a rate of around 1 terabit per second. This data should be processed by the decoder at least as fast as it is generated to prevent a backlog of data that grows exponentially in the T-gate depth of the computation. Further, the latency of the decoder (the time it takes after the last measurement until the decoding is complete) should be minimized, as longer latency will slow down the logical clock rate of the quantum computer.

The present disclosure addresses this problem and provides a method to parallelize the execution of an accurate decoder for a large class of useful and practically-viable topological quantum error-correcting codes including the surface code. Multiple workers decode measurement data in parallel whilst tracking a global state of the decoder in an atomic data structure referred to herein as a compressed logical flip tracking table. Therefore, a final coordination step at the end of the decoding is not required-unlike conventional techniques that, e.g., divide up spacetime regions of the detector graph to be processed by multiple worker threads in parallel. Accordingly, the decoding process is faster and has lower latency than conventional techniques.

In addition, the presently described techniques do not require any special purpose hardware and can be implemented using relatively inexpensive CPUs, which in turn can lower costs associated with decoding and improve performance, e.g., of future quantum data centers.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for parallel decoding of measurement data obtained from a quantum computer that implements a quantum error correcting code. A decoder implements a main thread and multiple worker threads. The main thread provides multiple worker threads with respective clusters in a detector graph. The worker threads process the respective clusters in parallel and mostly independently, requiring coordination only when two or more clusters grow to meet one another. The decoder maintains an atomic data structure that tracks the global state of the decoder to maintain thread-safety and correctly coordinate cluster growth between threads.

Figure 1:
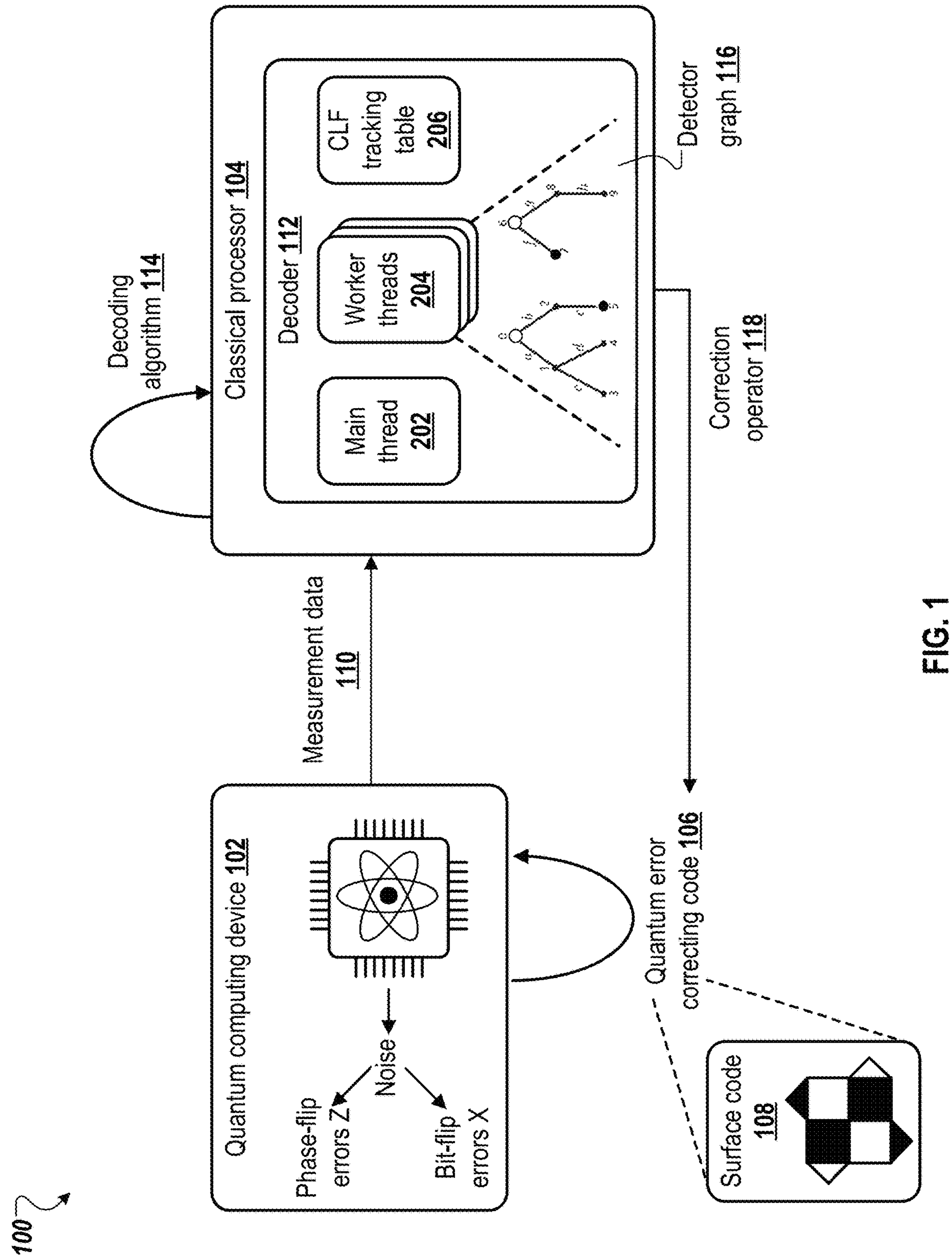
FIG. 1 is a block diagram of an example computing system for parallel execution of a quantum error correcting code

FIG. 1 is a block diagram of an example computing system 100 for parallel execution of a quantum error correcting code. The example computing system 100 is an example of a system implemented as classical and quantum computer programs on one or more classical computers and quantum computing devices in one or more locations, in which the systems, components, and techniques described herein can be implemented.

The example computing system 100 includes a quantum computing device 102 and a classical processor 104. For illustrative purposes, the quantum computing device 102 and classical processor 104 shown in FIG. 1 are illustrated as separate entities, however in some implementations the classical processor 104 may be included in the quantum computing device 102. For example, in some implementations the quantum computing device 102 can be directly connected to the classical processor 104. In other implementations, the quantum computing device 102 can be connected to the classical processor 104 through a network, e.g., a local area network (LAN), wide area network (WAN), the Internet, or a combination thereof.

The quantum computing device 102 includes components for performing quantum computation. For example, the quantum computing device 102 can include a quantum data plane that, in turn, includes multiple physical qubits, a control and measurement plane that is configure to perform operations and measurements on the physical qubits, a control processor plane that is configured to determine sequences of operations and measurements that a quantum algorithm being performed by the quantum computing system requires, and a classical computer that is in data communication with the control processor and facilitates user interactions and access to networks or storage. The particular type of the quantum computing device 102 can depend on the type of qubit used. In some implementations the qubits can be superconducting qubits, semiconducting qubits, photonic qubits, or atom-based qubits. For example, the qubits can include Xmon qubits, flux qubits, phase qubits, CAT qubits, or qubits with frequency interactions.

Typically, quantum computations performed by the quantum computing device 102 will be noisy due to the unavoidable presence of errors caused by, e.g., unwanted interactions between qubits, unwanted interactions with the environment (causing decoherence), faulty quantum gates or operations, or errors in the state preparation or measurement process. Example types of errors include coherent errors that act on single qubits, e.g., Pauli X-type errors called bit-flip errors that map the qubit basis states $X|0\rangle=|1\rangle$ and $X|1\rangle=|0\rangle$ and Pauli-Z errors called phase-flip errors that map the qubit basis states $Z|0\rangle=|0\rangle$ and $Z|1\rangle=-|1\rangle$. Noise in a quantum computing device can be represented by an error model, e.g., independent error models as described in more detail below. If left unchecked, errors can destroy quantum information and render quantum computations performed by the quantum computing device 102 useless.

Therefore, the quantum computing device 102 can be configured to execute a quantum error correcting code 106 when performing quantum computations. Quantum error correcting codes encode a first number k of qubits (a Hilbert space of dimension 2k) into a second number n of qubits (a Hilbert space of dimension 2n), where the second number is larger than the first number, i.e., n>k. The k qubits are data qubits that store logical information and are to be protected from error. The additional n-k qubits are ancilla qubits that are used to detect errors. Example quantum error correcting codes include Stabilizer codes, e.g., the surface code 108.

The surface code 108 encodes a logical qubit into a patch of multiple physical qubits on a lattice, e.g., a square or hex grid. The lattice includes alternating data qubits and ancilla qubits, where a qubit is placed on each edge of the lattice. The code is defined to be the ground space of the Hamiltonian $H=-\Sigma_{v\in V}X_v-\Sigma_{f\in F}Z_f$ where V represents vertices of the lattice, F represents faces defined by edges connecting vertices of the lattice, the operator $X_v$ is associated with vertex v and is a product of Pauli-X matrices acting on edges incident to v, and the operator $Z_f$ is associated with face f and is a product of Pauli-Z matrices acting on all edges of f. The code space is defined as the simultaneous "+1" eigenstate of the operators $X_v$ and $Z_f$. These operators (or products of these operators) are called the stabilizers of the code. When an error has affected the qubits of the code, any stabilizer that anti-commutes with the error returns a "−1" measurement outcome. A subset of vertices with −1 measurement outcomes is called a syndrome σ. The syndrome σ can be used to determine a correction operator that, when applied to the code, corrects the error up to a stabilizer.

During execution of the quantum error correcting code 106, the quantum computing device 102 is configured to provide measurement data 110 to the classical processor 104. The measurement data 110 can be received as a batch or stream of data. The measurement data 110 includes classical measurement outcome bits, e.g., corresponding to stabilizer measurements. In the present disclosure, a detector is a parity of measurement outcome bits that is deterministic in the absence of errors. The outcome of a detector measurement is 1 if the observed parity differs from the expected parity for a noiseless computation and is 0 otherwise. A Pauli-type error P is said to flip a detector D if including P in the circuit changes the outcome of D, and a detection event is a detector with outcome 1. A logical observable is a linear combination of measurement bits, whose outcome corresponds to the measurement of a logical Pauli operator.

The classical processor 104 includes components for performing classical computations. For example, the classical processor 104 can be implemented as one or more computer programs, i.e., one or more modules of computer program instructions encoded on a tangible non-transitory storage medium for execution by, or to control the operation of, a data processing apparatus. The computer storage medium can be a machine-readable storage device, a machine-readable storage substrate, a random or serial access memory device, or a combination of one or more of them.

The classical processor 104 implements a decoder 112 that is configured to process measurement data 110 received from the quantum computing device 102 to decode the measurement data, i.e., predict which errors may have occurred during the quantum computation performed by the quantum computing device 102. To process the measurement data 110, the decoder 104 is configured to execute a decoding algorithm 114 (also referred to herein as a decoding process) that maps the decoding problem onto a graph problem using a graph-like error model for the quantum error correcting code 106.

A graph-like error model is an independent error model, i.e., a set of m independent error mechanisms, where error mechanism i occurs with probability p [i] (where $p \in R_m$ is a vector of priors) and flips a set of detectors and observables. In a graph-like error model, each error mechanism flips at most two detectors. Graph-like error models can be used to approximate common noise models for many important classes of quantum error correction codes including surface codes, for which X-type and Z-type Pauli errors are both graph-like.

A graph-like error model is represented by a detector graph of nodes and edges G=(V, E), e.g., detector graph 116. Each node v E V in the detector graph corresponds to a detector. Each edge $e \in E$ is a set of detector nodes of cardinality one or two representing an error mechanism that flips this set of detectors. The set of edges E can be decomposed as $E=E_1 \cup E_2$ where for each edge e in $E_1$, $|e|=1$ and for each edge e in $E_2$, $|e|=2$. A regular edge $e=(u, v) \in E_2$ flips a pair of detectors u, $v \in V$, whereas a half-edge $(u) \in E_1$ flips a single detector $u \in V$. A half-edge can be connected to a boundary of the detector graph, in which case the edge can be defined as (u, $v_b$) where $v_b$ is a virtual boundary node (which does not correspond to any detector). In some implementations, e.g., when the graph problem is solved using minimum weight perfect matching, each edge can be assigned a weight, e.g., $w(e_i)=\log \log (1-p[i])/p[i]$. Each edge can also be labelled with a set of logical observables that are flipped by the error mechanism, which is denoted either by $l(e_i)$ or l(u, v) for $e_i=(u, v) \in E$. The distance D(u, v) between two nodes u and v in the detector graph is equal to the length of the shortest path between them.

Example decoding algorithms include minimum weight perfect matching (MWPM) and union find. MWPM decoding processes determine a most probable physical error consistent with syndromes in the measurement data. Detection events in measurement data are identified and labelled in the detector graph. A minimum weight embedded matching of the detection events in the detector graph is then determined, where an embedded matching of a set of detection events is a set of edges in the detector graph where each node corresponding to a detection event in the set of detection events is incident to an odd number of edges in the set of edges and each node that does not correspond to a detection event in the set of detection events is incident to an even number of edges in the set of edges. In conventional implementations of MWPM decoding processes, Edmond's blossom algorithm is used to determine the embedded matching, e.g., by seeding clusters of nodes in the detector graph using the detection events and growing, shrinking, or freezing the clusters until the minimum weight embedded matching is obtained. The embedded matching is used to determine a prediction of which logical observable measurements were flipped, which can in turn be used to determine a correction operator that, when applied to the quantum error correcting code 106, corrects the errors.

Union find decoding processes can be viewed as an approximation of minimum weight perfect matching decoding processes. A union find decoding process identifies detection events in measurement data and seeds clusters of nodes in the detector graph using the detection events. The clusters are then iteratively grown in the detector graph until the parity of the cluster changes. A so-called peeling step is then performed. A spanning tree for each grown cluster is generated and estimations of error are computed by traversing the spanning trees in reverse order. A correction operator that, when applied to the quantum error correcting code 106, corrects the errors is then determined.

Returning to FIG. 1, the decoder 112 implements a main thread 202, multiple worker threads 204, and a compressed logical flip tracking table 206. The main thread 202 is configured to manage the multiple worker threads 204 and coordinate execution of the decoding algorithm 114. The main thread 202 is configured to receive the measurement data 110 from the quantum computing device 102 and generate a detector graph for the measurement data. The main thread 202 uses detection events in the measurement data to seed clusters of nodes in the detector graph with non-zero parity and places the seeded clusters into a central list structure.

The multiple worker threads 204 are each configured to pull seeded clusters from the central list structure. Each of the multiple workers 204 then modify, e.g., grow by adding some or all nodes from the cluster boundary in accordance with cluster growth rules, shrink, or freeze, their seeded clusters according to the decoding algorithm 114. Each worker thread is configured to modify its clusters in parallel to one another and independently from one another, requiring coordination only when two or more clusters grow to meet one another.

The multiple workers 204 are configured to modify the seeded clusters whilst tracking a global state of the decoder 112 in an atomic data structure referred to herein as a compressed logical flip tracking table 206. Therefore, a final coordination step at the end of the decoding algorithm 114 is not required-unlike conventional techniques that, e.g., divide up spacetime regions of the detector graph to be processed by multiple worker threads in parallel. Note that in these conventional parallelizations of finite decoders, the final coordination step is necessary because the finite decoding algorithm is designed to operate on the entire decoding graph, whereas the parallel version can only access a limited spacetime region (or block) of the decoding graph. During the final coordination step, the solutions within each block must be cross-referenced to find and resolve any inconsistencies. The cross-referencing may include, for example, determining whether the errors predicted within one block agree with the errors predicted within another block. The difficulty/overhead of the final coordination cross-referencing may increase with the size of the blocks or remain constant. In either case, the number of blocks must increase with the number of rounds of syndrome extraction to maintain bounded latency, so the amount of work to be done during this final coordination step must increase as well (with the number of blocks). In such a conventional parallel decoder, simply ignoring this extra coordination step at the end of decoding will generally lead to a different output than the decoding algorithm of the underlying single-threaded decoder and will not suppress errors to the full amount possible for the chosen code distance. In contrast, the decoding algorithm introduced herein tracks the decoding prediction and cross-references to resolve inconsistencies between worker threads incrementally during decoding, so there is no need for a final coordination step. Incrementally tracking the net logical flip is not the same as a final coordination step because it takes place incrementally during decoding instead of after decoding is complete. It therefore does not contribute to the latency of the decoder. Example operations performed by components of the decoder 112 are described in more detail below with reference to FIGS. 2-5.

After the decoder 112 has completed the decoding algorithm 114, the classical processor 104 is configured to output a correction operator 118. The correction operator 118 can be applied to the quantum error correcting code 106 to correct the errors identified by the decoder 112.

Figure 2:
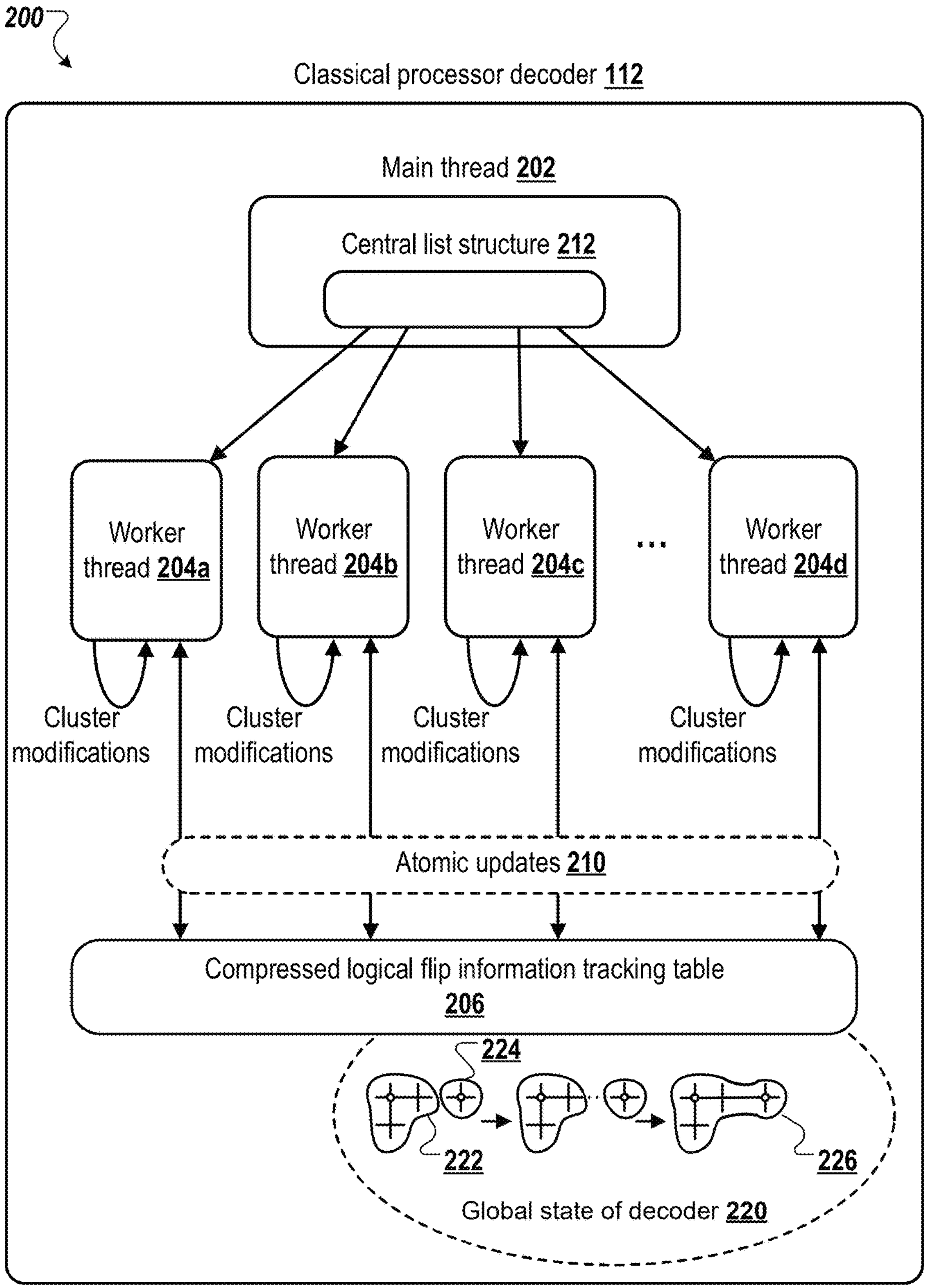
FIG. 2 is a block diagram of an example classical processor decoder.

FIG. 2 is a block diagram 200 of an example classical processor decoder 112. The decoder 112 can be implemented as one or more computer programs, i.e., one or more modules of computer program instructions encoded on a tangible non-transitory storage medium for execution by, or to control the operation of, a data processing apparatus. The computer storage medium can be a machine-readable storage device, a machine-readable storage substrate, a random or serial access memory device, or a combination of one or more of them.

As described above with reference to FIG. 1, the decoder 112 implements a main thread 202, multiple worker threads 204*a-d*, and a compressed logical flip tracking table 206. For convenience, the example decoder 112 shown in FIG. 2 includes four worker thread 204*a-d*, however in some implementations the decoder 112 can include a different, e.g., larger, number of worker threads. The components of the decoder 112 can be connected via a network, e.g., a local area network (LAN), wide area network (WLAN), the Internet, or a combination thereof, which can be accessed over a wired and/or a wireless communications link.

As described above with reference to FIG. 1, the main thread 202 is configured to manage the multiple worker threads 204*a-d* and coordinate execution of a decoding process. The main thread 202 is configured to receive measurement data from a quantum computing device and generate a detector graph for the measurement data. The main thread 202 identifies detection events (which are caused, e.g., by noise afflicting hardware qubits in the quantum computing device) in the measurement data and uses the detection events to seed clusters of nodes in the detector graph with non-zero parity. The main thread 202 is configured to place the seeded clusters into a central list structure 212.

Each worker thread of the multiple worker threads 204*a-d* is configured to access the central list structure 212 and pull respective seeded clusters from the central list structure 212. Each worker organizes the seeded clusters pulled from the central list structure 212 into a private sorted data structure that implements an overall job allocation strategy.

In some implementations, the job allocation strategy can be based on dividing a circular spacetime buffer into regions owned by a tiling of the worker threads 204*a-d*. Alternatively, in some implementations the job allocation can be random, based on a load of the individual worker threads, or it can be a combination of multiple heuristics. For example, in some implementations excited clusters (clusters with non-zero parity) that extend further back in time can be prioritized over new clusters that are confined to a later time window. This job allocation strategy is intended to reduce latency in real-time decoding. In some implementations, growing excited clusters that extend too near to the future horizon, i.e., the earliest time coordinate for which not all measurement outcomes are known to the decoder, can be prohibited. In some implementations, the modification of smaller excited clusters can be prioritized over the modification of larger excited clusters, where the size of the cluster is determined either based on the boundary size (which can be measured by the number of adjacent vertices or the number of incident edges in the graph leading out of the cluster), based on a number of graph nodes included in the cluster, or a combination of these quantities.

Each worker thread is configured to modify clusters stored in its private sorted data structure according to heuristics specified by the decoding process being performed by the decoder 112. As a non-limiting example, in some implementations the decoding process can be a Union-Find decoding process. In these implementations, each worker thread can grow the clusters stored in its private sorted data structure, e.g., until each cluster has even parity or meets a boundary of the detector graph. As another non-limiting example, in some implementations the decoding process can be a minimum weight perfect matching decoding process. In these implementations, each worker thread can grow, shrink, or shatter the clusters stored in its private sorted data structure, e.g., until each cluster has even parity or meets a boundary of the detector graph.

In some implementations, one or more of the worker threads 204*a-d* can be configured to compute current cluster modification priorities for clusters in its private sorted data structure before each modification step. The worker threads 204*a-d* can then determine whether the current cluster modification priorities differ to expected modification priorities, e.g., as computed at a previous modification step. If a worker thread determines that the current cluster modification priorities differ to expected modification priorities, the worker thread can adjust the order at which the clusters are to be processed. Generally, a priority of a cluster will only decrease as the cluster is grown, so that traversing a once-sorted list of clusters while re-inserting (at a correct sort position) each cluster whose re-computed priority does not match the previously-computed value constitutes a valid iteration through all clusters in-priority order.

The compressed logical flip tracking table 206 is shared by the worker threads 204*a-d*, i.e., is common to each worker thread. As the worker threads 204*a-d* execute the decoding process and modify their respective clusters, they update data in the compressed logical flip tracking table 206 that corresponds to their respective clusters under an atomicity primitive, e.g., a compare-and-swap atomicity primitive or an atomic pool allocator with reference counting. The atomicity primitive enables each worker thread to track whether another worker thread has modified its cluster and therefore achieve thread-safety. The compressed logical flip tracking table 206 therefore avoids the need for locks and can be lock-free.

For example, a first worker thread may work on a first cluster, e.g., cluster 222, and a second worker thread may work on a second cluster, e.g., cluster 224. During the decoding process, the first worker and second worker may grow their respective clusters such that the first cluster and second cluster meet and, under the decoding process, are fused into one cluster 226. Under the atomicity primitive, the first worker thread (or second worker thread) can determine that they should stop modifying their cluster and allow the second worker thread (or first worker thread) to proceed with modifying the fused cluster 226. The first worker thread (or second worker thread) can then pull a new cluster from its private sorted data structure to modify.

The compressed logical flip tracking table 206 therefore tracks the dynamic system of (disjoint) clusters as they are seeded by the main thread 202 and modified by the worker threads 204*a-d*. In other words, the compressed logical flip tracking table 206 tracks a global state 220 of the decoder 112, e.g., tracks each cluster and how it is modified during the decoding process.

The compressed logical flip tracking table 206 stores data for each cluster that is included in the detector graph. During the decoding process (e.g., after the cluster has been seeded and one or more modifications have been made), each cluster includes a root node (that has no ascendant node) and one or more descending child nodes (where the child nodes include leaf nodes with no descending nodes or one or more descending child nodes). That is, each cluster is represented by a connected tree and the entire collection of clusters in the detector graph are a forest of such trees.

The data stored in the compressed logical flip tracking table 206 for a specific cluster includes data associated with the cluster as a whole, e.g., data specifying properties of the cluster such as a parity of detection events included in the cluster, a size of the cluster, and the boundary nodes of the cluster. As described in more detail below with reference to FIGS. 3 and 4, this data can be stored at the root node of the cluster.

The data also includes compressed logical flip (CLF) information for child nodes in the cluster. Each edge in the decoding graph has, for each observable, a bit that indicates whether that edge's associated error mechanism causes the logical observable to be flipped. Note that a decoder (whether UF or MWPM) will choose a subset of the edges associated with a subset of errors that it predicts has occurred; the decoding prediction is then the bitwise sum of these logical flips across all edges chosen in the subset. In a compressed logical flip (CLF) scheme, the chosen edges are partitioned among the clusters and the CLF for each child node is the bitwise sum of the logical flips across the edges to its parent (or zero in the case of a root node). In MWPM decoding, the CLF bits of a node are the bitwise sum of the logical flips along the edges to its matched node (if the node has been matched). In UF decoding, the CLF bits of a root node are always 0, and the CLF information for a child node includes a parity flip that is applied to the logical observable by an operator whose 0-boundary consists of that child node's node and the node of a parent node in the tree/cluster (i.e., the net flip of the parity along the edges between the child and parent node within the decoding graph). The CLF information for multiple logical observables can be tracked in parallel and updated incrementally during decoding. Moreover, the CLF can be used along with the net parity of each cluster during decoding to incrementally track the net predicted flip(s) of the logical observable(s). As described in more detail below with reference to FIGS. 3 and 4, CLF information for a child node can be stored at the child node.

In some implementations the main thread 202 can be configured to allocate seeded clusters in the central list structure 212 to respective worker threads. To avoid contention, the scheduling strategy should mostly allocate excited clusters to be grown by distinct worker threads. However, this can be problematic since for the decoder 112 to be wait-free (a desirable property, e.g., for real-time decoding), all worker threads should be able to proceed with completing work even when one worker thread is stopped.

This can be enabled through so-called work-stealing, which can be implemented due to the atomicity of the compressed logical flip tracking table 206. For example, in some implementations a worker thread can record clusters that are not specifically assigned to the worker thread as it reads the list of available clusters in the central list structure 212 maintained by the main thread 202. Then, when the worker thread has finished modifying the clusters it pulled from the central list structure 212, the worker thread can steal (e.g., obtain) other clusters from other domains, e.g., other worker threads. The worker thread can then execute the decoding process and modify the "stolen" clusters.

The decoder 112 can be configured to implement work stealing with minimal overhead using a separate data structure that tracks clusters as they are allocated to the worker threads 204*a-d*. The separate data structure only needs to be updated when the main thread 202 seeds new clusters or when a worker thread performs a work steal, so that there is minimal overhead of tracking this information.

When a worker thread has cycled through all queued clusters in its private sorted data structure, the worker threat can be configured to pull new clusters from the central list structure 212. If no excited clusters remain in the central list structure 212, the worker thread can be configured to wait for new rounds of measurement data to become available (e.g., wait for the main thread to seed new clusters using new measurement data). Alternatively, or in addition, the worker thread can perform operations in conjunction with the main thread 202 to complete clean-up or reset tasks, e.g., freezing and deleting old clusters that are no longer excited. Alternatively, or in addition, the worker thread can steal clusters from other worker threads, as described above.

When all clusters have been processed by the multiple worker threads 204*a-d*, e.g., all clusters have been modified to have zero parity, the decoder 112 can be configured to recover a decoding output using the processed clusters. The specific operations performed by the decoder 112 to recover the decoding output is dependent on the underlying decoding process. For example, in some implementations the decoder 112 can recover a decoding output by computing, for each processed cluster, a net logical flip on a path from a child node in the cluster that corresponds to a detection event to the root node of the cluster. The decoder 112 can then compute a total parity of all net logical flips over each of the processed clusters. The total parity of all net logical flips provides an overall prediction as to whether logical observables were flipped due to errors during the quantum computation. The total parity of all net logical flips does not need to be computed at the end but can instead be kept up-to-date incrementally as the workers modify the data structure. When two clusters A and B are fused and A becomes the child of B, then the net flip is changed if A had nonzero parity and the CLF bit on the path from the root of A to the root of B is nonzero. This procedure generalizes straightforwardly to the case with more than one observable.

As described above with reference to FIG. 1, the decoder 112 (or, more generally, classical processor 104) can be configured to use the prediction to determine a correction operator that, when applied to the quantum error correcting code performed by the quantum computing device, corrects the errors.

Figure 3:
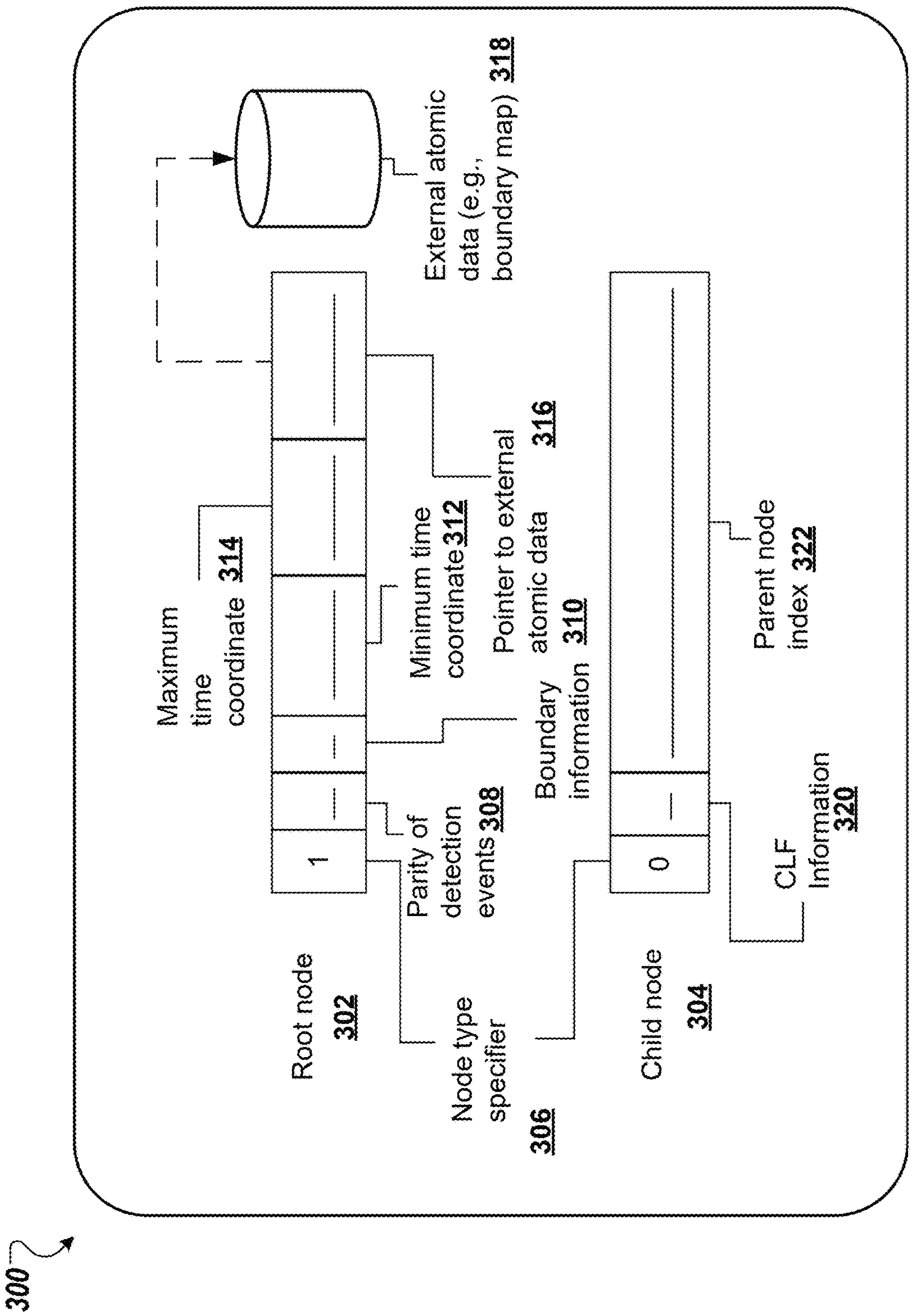
FIG. 3 is a schematic block diagram of the data stored in a compressed logical flip tracking table for a particular cluster of nodes in a detector graph.

FIG. 3 is a schematic block diagram 300 of the data stored in a compressed logical flip tracking table for a particular cluster of nodes in a detector graph. As described above with reference to FIG. 2, the data stored in the compressed logical flip tracking table for a particular cluster includes data associated with the cluster as a whole, e.g., data specifying properties of the cluster. This data can be stored at a root node 302 of the cluster and is kept up-to-date as modifications to the cluster are made. The data stored in the compressed logical flip tracking table for a particular cluster also includes compressed logical flip (CLF) information for each child node in the cluster. CLF information for a child node can be stored at the child node, e.g., CLF information 320 for child node 304 can be stored at the child node 304.

The stored data can include a node type specifier 306, e.g., an indication as to whether each node in the compressed logical flip tracking table corresponds to a root node or a child node. In the example shown in FIG. 3, the node type specifier "1" indicates that the node is a root node and the node type specifier "0" indicates that the node is a child node. When two clusters are fused, it is necessary to modify the root node of one of the original clusters to point to the root node of the new combined cluster. This requires the determination as to whether a given node is, in fact, a root. This is why a node type specifier bit is stored in the stored data for each node. There are other ways in which this could be done. For example, every node could instead have a pointer to its parent, with a null (zero) value indicating that a node is actually a root node that does not have a parent. One advantage of the scheme in which a single bit is used instead is that it allows the space otherwise used to store a null value to be used instead to store additional data at the root node.

The stored data can also include data specifying a parity of detection events 308 included in the cluster. This data is a property of the cluster (not a particular child node included in the cluster) and is therefore stored at the root node 302. When the cluster is first seeded, the parity of the detection events 308 is non-zero, e.g., 1. When the cluster is modified, e.g., grown, and fuses with another cluster, the parity of detection events 308 is updated to 0 since the cluster will then include two detection events. In some implementations, updating the parity of detection events 308 from 1 to 0 can "freeze" the cluster so that no further modifications are made to the cluster by a worker thread, unless and until another cluster with nonzero parity grows to meet and fuse with the zero parity cluster. In the event that this happens, the parity can be used to incrementally update the net logical flip information according to the net logical flip tracking protocol described above.

The stored data can also include data specifying boundary information 310 of the cluster. This data is a property of the cluster (not a particular child node included in the cluster) and is therefore stored at the root node 302. The boundary information 310 can include data specifying whether the cluster has reached the boundary of the code's decoding graph. Once connected to the boundary, a cluster's parity is set to zero and it does not grow again during decoding. The boundary information 310 can also include data specifying which nodes in the detector graph currently form the boundary of the cluster. This information can be used by the worker threads to determine a current size of the cluster, e.g., which in turn can be used to prioritize the processing of some clusters over other clusters.

The stored data can also include data specifying a minimum time coordinate 312 and a maximum time coordinate 314. This data is a property of the cluster (not a particular child node included in the cluster) and is therefore stored at the root node 302. The time coordinates can be used to prioritize cluster growth. For example, in one implementation excited clusters that extend to an earlier time coordinate can be prioritized over clusters that are confined to later time coordinates to reduce latency in RT decoding. The time coordinate can also be used to prohibit growing excited clusters that extend too near to the future horizon, i.e., the earliest time coordinate for which not all measurement outcomes are known to the decoder.

The stored data also includes CLF information for each child node, e.g., CLF information 320 for child node 304. CLF information for a child node is stored at the child node. The CLF information can be used along with the net parity information by the decoder to incrementally compute during decoding a net number of logical flips on a path that includes the corresponding child node.

The stored data also includes a parent node index for each child node, e.g., parent node index 322 for child node 304. The parent node index points to the parent (ascendant) node of the child. The parent node index for a child node is stored at the child node. The parent node index can be used by the decoder to identify a path from a child node in the cluster that corresponds to a detection event to the root node of the cluster, e.g., when the decoder generates a decoder output and computes a net logical flip on a path from a detection event to a root node.

In some implementations the stored data can also include data specifying neighboring nodes of a cluster that are not yet included in the cluster. These neighboring nodes encode the graph structure as a boundary map going from node to CLF bit (which is equal to one if the edge traversed from the cluster to reach the node flips the logical observable). The boundary map can be large and therefore a pointer 316 to an external memory region that stores external atomic data 318 can be stored at the root node 202 and the boundary map can be stored in the external memory region. That is, the most important data (data stored at the root node and child nodes) can be compressed to fit within one word of fixed size, e.g., 64 bits, and remaining data can be stored in the external memory region. In some implementations, the external memory region that stores the external atomic data 318 can use memory managed by an atomic allocator with reference counting to ensure that memory is only reallocated once all references to it are released, avoiding memory access violations. The boundary map is used during cluster growth to find the next node(s) to add to a growing cluster.

In some implementations one or more optimizations can be implemented to improve the performance of the compressed logical flip tracking table, which can be particularly beneficial since the compressed logical flip tracking table is a core shared global data structure of the decoder 112. Atomic compare-and-swap on large (multi-word) data objects is naively required for the compressed logical flip tracking table. This can be implemented using hardware transactional memory (HTM) on certain processors. However, on most central processing units, only single word compare-and-swap, e.g., x86 cmpxchg, is available as a hardware instruction. Even on chips supporting HTM, transactions can sometimes fail spuriously requiring fallback to simpler atomic primitives. To build multi-word compare-and-swap from single-word compare-and-swap, some conventional techniques suggest to constantly allocate fresh memory and use a layer of indirection along with single word compare-and-swap to emulate a multi-word compare-and-swap. However, this leads to unbounded memory usage and can damage performance due to many extra reads and writes to memory that result from excess copies and the layer of indirection.

One or more of the following techniques can therefore be implemented in combination to atomically protect the required node data with better performance than the above-described naive solution.

For example, the allocation of fresh memory is not required if the data that is to be updated is packed into a single word. Multiple pieces of data such as parent node specifiers and cluster parity can be non-trivially packed alongside a pointer to external atomic data (if required) within a 64-bit word. Updates to the packed data do not require any load/store to the external memory, improving performance.

As another example, regions of memory storing external atomic data objects cannot be recycled in the naive implementation because a stalled worker thread that obtained a pointer to that memory may eventually dereference it, leading to an inconsistent state if the memory has been recycled. However, this can be overcome by using an atomic pool allocator with reference counting.

As another example, when externally stored atomic data objects are required, the naive approach for reducing this data to the root of the tree is to make a copy to fresh external memory and then compare-and-swap to update the pointer in the node word. Performance can be improved by instead implementing a pop/push technique. A core problem with updating members of the root node in-place is that the node may cease to be a root due to the actions of a second "interfering" worker thread, even when an update to the external data could succeed. A naive solution would be to have the updating worker thread check if the node is still a root after updating the external memory to detect this case. If the worker thread detects such a case, the worker thread does not see a change and the external memory update can be considered to be complete. If the worker thread does detect a change, then the worker thread would determine to climb the tree (cluster) and continue making updates to the external data at the new root.

However, there is ambiguity about how the worker thread should reconcile the original modified data. This ambiguity arises because the interfering worker thread's own read from that external memory to propagate it up the tree could happen either before or after the first thread's successful update to the external memory. One example method to avoid this ambiguity is to impose a conservation law upon externally-stored atomic data objects. Specifically, data from these objects can be atomically "popped" off the memory of child nodes before atomic "push" updates add the data to the objects associated with the root node.

For example, an integer size counter (with a sum as the reduce operation) could be set to zero with a compare-and-swap before adding its value to the root node with an atomic add instruction. By imposing conservation laws on data stored in externally-allocated memory pointed to from a root node, any missteps due to interfering threads can be detected and unambiguously corrected. For example, if a worker thread pushes data to the object of a root node, only to find it is no longer a root, then this push can be rewound by a pop. Next, the worker thread can climb the tree to the new root node, and finally the worker thread can push onto the object pointed to by the new root node. There is no ambiguity in this case about which worker thread is able to add this data to the root because it is determined by whichever worker thread's atomic pop succeeds. The pop-and-push paradigm provides a general incremental method for guaranteeing atomicity of the reduce operations performed on each set in the system without extra reads and writes. Beyond integer counters, any atomic data structure such as a linked list that can be atomically "popped from" and "pushed to" can be used inside the atomic external data object pointed to by root nodes. For example, as a general strategy for any 63-bit payload, a "deleted" bit can be appended to indicate that it has been "popped", and the reference counting of the pool allocator can be used to recycle dead memory locations.

Figure 4:
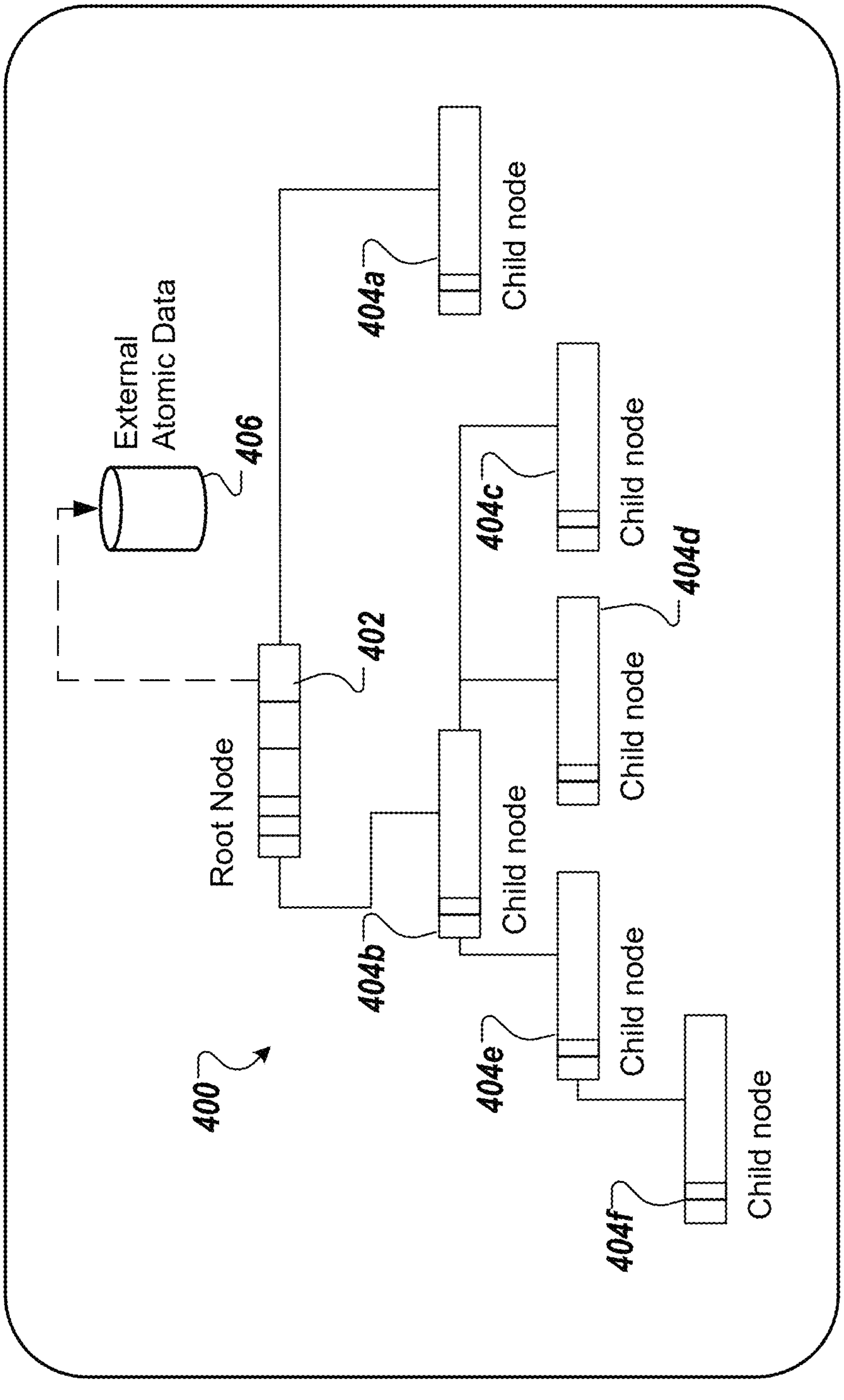
FIG. 4 is a schematic block diagram of a tree of nodes included in the forest that comprises the compressed logical flip tracking table.

FIG. 4 is a schematic block diagram of a tree 400 of nodes included in the forest that comprises the compressed logical flip tracking table. As described above with reference to FIG. 2, the compressed logical flip tracking table stores data for each cluster that is included in the detector graph. Each cluster includes a root node 402 (that has no ascendant node) and one or more descending child nodes 404*a-f* (where the child nodes include leaf nodes with no descending nodes, e.g., child nodes 404*a*, 404*c*, 404*d*, and 404*f*, or child nodes with one or more descending child nodes, e.g., child nodes 404*b* and 404*c*. That is, each cluster is represented by a connected tree 400 and the entire collection of clusters in the detector graph are a forest of such trees.

Figure 5:
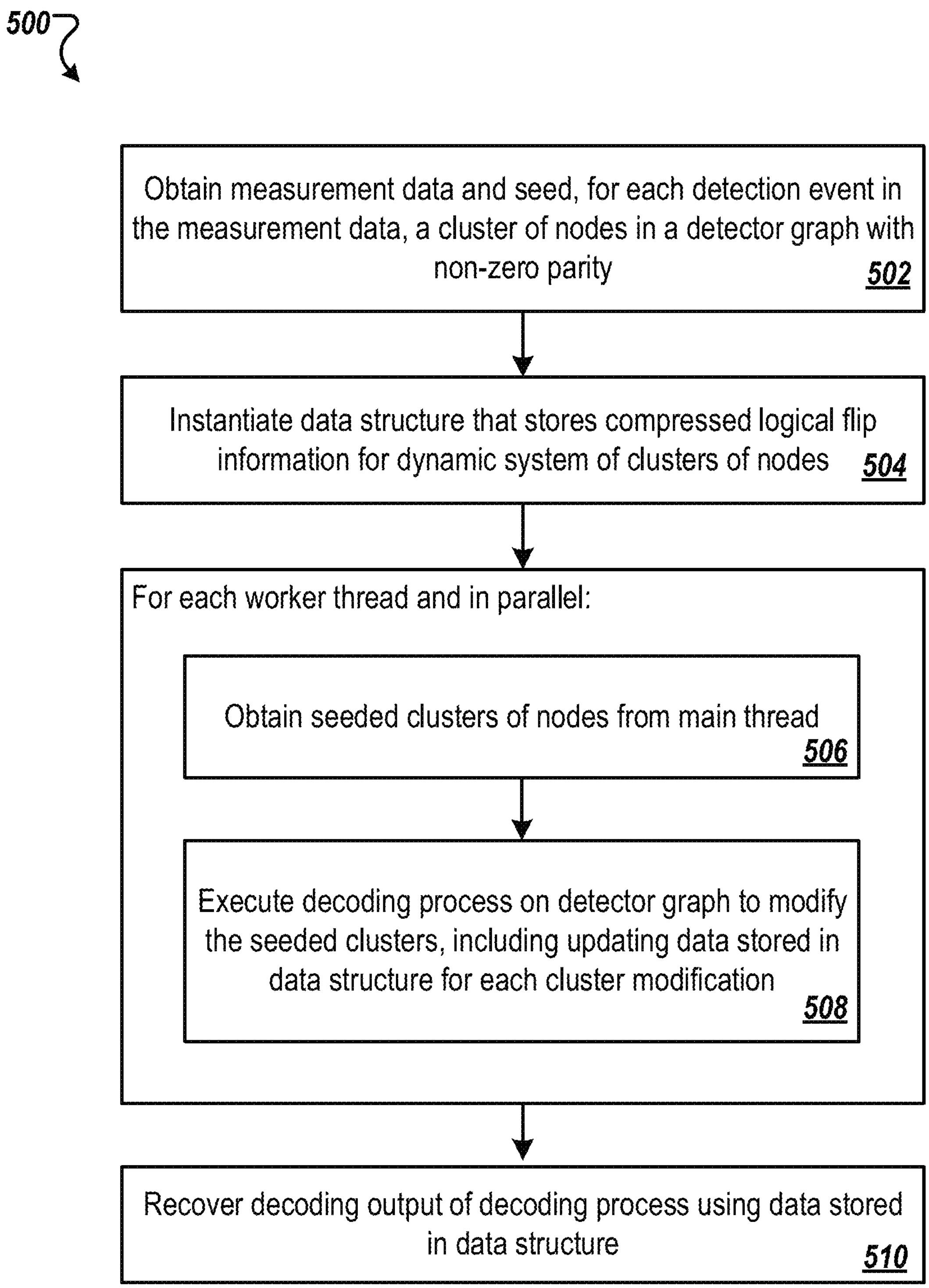
FIG. 5 is a flowchart of an example process for executing a decoding process on measurement data received from a quantum computing system to determine errors in a quantum computation implemented by the quantum computing system.

FIG. 5 is a flowchart of an example process 500 for executing a decoding process on measurement data received from a quantum computing system to determine errors in a quantum computation implemented by the quantum computing system. For convenience, the process 500 will be described as being performed by components of a classical computing system. For example, a classical decoder, e.g., decoder 112 of FIGS. 1 and 2, appropriately programmed, can perform example process 500.

The system obtains the measurement data from the quantum computing system and generates a detector graph for the decoding process. The system then identifies one or more detection events in the measurement data and, for each identified detection event, seeds a cluster of nodes in the detector graph with non-zero parity (step 502). The system places the seeded clusters of nodes into a central list structure.

The system instantiates a data structure common to each worker thread of multiple worker threads (step 504). The data structure stores data of the clusters of nodes of the detector graph during the decoding process, e.g., stores data of the dynamic system of clusters during the decoding process. Each cluster of nodes includes a root node that has no ascendant node and can include one or more descending child nodes, where the child nodes include leaf nodes with no descending nodes or one or more descending child nodes. The number of child nodes included in each cluster can vary as the decoding process is performed, e.g., as the clusters are grown or shrunk, which is why the system of clusters is referred to as a dynamic system of clusters.

The data stored in the data structure includes compressed logical flip information of child nodes in each cluster of nodes. Compressed logical flip information of a child node comprises a parity of logical flips along a decoding graph path from the child node to its parent node, and wherein the compressed logical flip information is used with cluster parity information to determine a parity flip applied to a logical observable by a fusion of two clusters. Compressed logical flip information of a child node includes a parity flip applied to a logical observable by an operator with a 0-boundary that includes the child node and a parent node in the tree (i.e., the net flip of the parity along the edges between the child and parent node within the decoding graph). The compressed logical flip information of a child node can be stored in the data structure at the child node.

The data stored in the data structure can also include data that specifies properties of each cluster. For example, for a particular cluster, the data can include data specifying one or more of: a node type specifier, a parity of detection events in the cluster of nodes, a total size of the cluster of nodes, boundary nodes of the cluster of nodes, a minimum time coordinate, and a maximum time coordinate. This data can be stored in the data structure at a root node of the particular cluster.

The system executes the decoding process on the detector graph to modify the seeded clusters of nodes in the detector graph. Each worker thread of the multiple worker threads obtains one or more of the seeded clusters of nodes (step 506) and executes the decoding process on the detector graph to modify the obtained one or more clusters of nodes (steps 508). The multiple worker threads can perform steps 506 and 508 in parallel. For each cluster modification, the worker thread implementing the modification updates corresponding data in the data structure under an atomicity primitive. In some implementations the atomicity primitive can be a compare-and-swap atomicity primitive or an atomic pool allocator with reference counting. The system recovers a decoding output of the decoding process using the updated data in the data structure (step 510). For example, the system can use the data stored in the data structure to compute, for each node in the detector graph that is associated with a detection event, a net logical flip on a path to a respective root node of the node. The system can then compute a total parity of the net logical flips (a computation which can be performed, and corresponding result stored incrementally during decoding) to obtain a prediction as to whether logical observables in the quantum computation were flipped due to errors. The system can use the prediction to determine a correction operator that, when applied to the quantum computing system, corrects the errors.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A system comprising:

a classical computer system configured to implement a worker thread of a decoding process on measurement data received from a quantum computing system to determine errors in a quantum computation implemented by the quantum computing system, wherein the worker thread is one of a plurality of worker threads;

a data structure on the classical computer system, wherein each other worker thread also has a data structure common to the data structure on the classical computer system, wherein the data structure stores data of a dynamic system of disjoint clusters of nodes of a detector graph for the decoding process, wherein:

each cluster of nodes comprises a root node that has no ascendant node and one or more descending child nodes, wherein the child nodes include leaf nodes with no descending nodes or one or more descending child nodes; and the data comprises compressed logical flip information of child nodes in each cluster of nodes;

wherein during execution of the decoding process, the worker thread is configured to, in parallel with each of the other worker threads:

obtain, from a main thread running on a data processing apparatus, one or more clusters of nodes in the detector graph, wherein each cluster of nodes comprises one or more detection events in the measurement data; and execute the decoding process to modify the one or more clusters of nodes, wherein, for each modification of a cluster, the worker thread updates data in the data structure that corresponds to the cluster.

2. The system of claim 1, wherein the data structure stores, at a root node of each cluster of nodes, data specifying one or more of: a node type specifier, a parity of detection events in the cluster of nodes, a total size of the cluster of nodes, boundary nodes of the cluster of nodes, a minimum time coordinate, and a maximum time coordinate.

3. The system of claim 1, wherein the classical computing system further comprises one or more memory regions external to the data structure, wherein each memory region stores a boundary map for a respective cluster of nodes.

4. The system of claim 3, wherein data objects in the memory region are stored under a conservation law, wherein under the conservation law, data in the data objects are popped off a child node memory before push updates add the data to objects associated with a root node.

5. The system of claim 1, wherein the compressed logical flip information of a child node included in a respective cluster of nodes is stored at the child node.

6. The system of claim 1, wherein compressed logical flip information of a child node comprises a parity of logical flips along a decoding graph path from the child node to its parent node, and wherein the compressed logical flip information is used with cluster parity information to determine a parity flip applied to a logical observable by a fusion of two clusters.

7. The system of claim 1, wherein the classical computing system is further configured to recover a decoding output of the decoding process, comprising using data in the data structure to:

compute, for each node in the detector graph that is associated with a detection event, a net logical flip on a path to a respective root node of the node; and compute a total parity of the net logical flips.

8. The system of claim 1, wherein the decoding process comprises a union-find or minimum weight perfect matching decoding process.

9. The system of claim 1, wherein the data structure is lock-free.

10. The system of claim 1, wherein, for each modification of a cluster, the worker thread updates data in the data structure that corresponds to the cluster under an atomicity primitive.

11. The system of claim 10, wherein the atomicity primitive comprises a compare-and-swap atomicity primitive or an atomic pool allocator with reference counting.

12. The system of claim 1, wherein updates of data in the data structure that correspond to a respective modification of a cluster are packed into a single word.

13. The system of claim 12, wherein the single word comprises a pointer to external atomic data.

14. A computer implemented method comprising:

obtaining, by a worker thread of multiple other worker threads and from a main thread, a cluster of nodes that comprises one or more detection events in measurement data received from a quantum computing system, wherein the cluster of nodes comprises a root node that has no ascendant node and one or more descending child nodes, the child nodes including leaf nodes with no descending nodes or one or more descending child nodes;

executing a decoding process on a detector graph to modify the obtained cluster of nodes, comprising, for each modification, updating, in a data structure, data that corresponds to the cluster, wherein the data structure stores data of a dynamic system of disjoint clusters of nodes of the detector graph and the data structure is common to the worker thread and the other worker threads, and the data comprises compressed logical flip information of child nodes in each cluster of nodes; and recovering a decoding output of the decoding process using the updated data in the data structure.

15. The method of claim 14, wherein recovering the decoding output of the decoding process using the updated data in the data structure comprises:

computing, for each node in the detector graph that is associated with a detection event, a net logical flip on a path to a respective root node of the node; and computing a total parity of the net logical flips.

16. The method of claim 15, wherein the data structure stores, at a root node of each cluster of nodes, data specifying one or more of: a node type specifier, a parity of detection events in the cluster of nodes, a total size of the cluster of nodes, boundary nodes of the cluster of nodes, a minimum time coordinate, and a maximum time coordinate.

17. The method of claim 14, wherein compressed logical flip information of a child node comprises a parity flip applied to a logical observable by an operator with a 0-boundary that comprises the child node and a parent node in a corresponding graph tree.

18. The method of claim 14, wherein the updating of the data that corresponds to the cluster is performed under an atomicity primitive.

19. The method of claim 18, wherein the atomicity primitive comprises a compare-and-swap atomicity primitive or an atomic pool allocator with reference counting.

20. The method of claim 14, wherein updating the data that corresponds to the cluster comprises packing the updates into a single word, wherein the single word comprises a pointer to external atomic data.

* * * * *